(12) United States Patent
Dolan

(10) Patent No.: US 11,368,810 B2
(45) Date of Patent: Jun. 21, 2022

(54) DIGITAL CONTENT RECONFIGURATION BASED ON PHYSICAL ACCOMMODATIONS

(71) Applicant: StubHub, Inc., San Francisco, CA (US)

(72) Inventor: Semirah Dolan, Franklin, MA (US)

(73) Assignee: StubHub, Inc., San Francisco, CA (US)

(*) Notice: Subject to any disclaimer, the term of this patent is extended or adjusted under 35 U.S.C. 154(b) by 222 days.

(21) Appl. No.: 16/177,266

(22) Filed: Oct. 31, 2018

(65) Prior Publication Data

US 2020/0137519 A1 Apr. 30, 2020

(51) Int. Cl.
*H04W 4/024* (2018.01)
*H04W 4/021* (2018.01)
*G06T 19/00* (2011.01)
*G06Q 10/02* (2012.01)
*G09B 21/00* (2006.01)

(52) U.S. Cl.
CPC ............ *H04W 4/024* (2018.02); *G06Q 10/02* (2013.01); *G06T 19/006* (2013.01); *H04W 4/021* (2013.01); *G09B 21/006* (2013.01)

(58) Field of Classification Search
CPC ...... H04W 4/021; H04W 4/024; G06Q 10/02; G06T 19/006; G09B 21/006
See application file for complete search history.

(56) References Cited

U.S. PATENT DOCUMENTS

| | | | |
|---|---|---|---|
| 2002/0116343 A1* | 8/2002 | Nakamura | G06Q 10/02 705/65 |
| 2002/0174003 A1 | 11/2002 | Redmann et al. | |
| 2011/0119732 A1 | 5/2011 | Dunn | |
| 2011/0147448 A1* | 6/2011 | Manuel-Devadoss ("Johnson Smith") | G06Q 30/02 235/375 |
| 2012/0078667 A1 | 3/2012 | Denker et al. | |

(Continued)

FOREIGN PATENT DOCUMENTS

| | | |
|---|---|---|
| CA | 2651543 C | 2/2008 |
| IN | 297175 A1 | 7/2009 |
| KR | 20140025928 A | 3/2014 |

OTHER PUBLICATIONS

International Search Report and Written Opinion, as issued in connection with International Patent Application No. PCT/US2019/054854, dated Feb. 12, 2020, 10 pgs.

(Continued)

*Primary Examiner* — Marcos L Torres
(74) *Attorney, Agent, or Firm* — McDermott Will & Emery LLP

(57) ABSTRACT

Digital content reconfiguration techniques and systems are described that address physical accommodations. In one example, a physical accommodation module identifies a type of digital content being requested and obtains the digital content. The physical accommodation module also obtains ticket data associated with a user that made the request. The ticket data is then processed by the physical accommodation module to determine a physical accommodation. The determined physical accommodation is then used by the physical accommodation module to reconfigure the digital content, and as such, may dynamically address the physical accommodation, e.g., for mobility, visual, auditory accommodations, whether the user is attending the event with minor children, and so forth.

19 Claims, 10 Drawing Sheets

(56) References Cited

U.S. PATENT DOCUMENTS

| | | | |
|---|---|---|---|
| 2015/0012307 A1* | 1/2015 | Moss | G06Q 10/02 |
| | | | 705/5 |
| 2015/0233715 A1* | 8/2015 | Xu | H04W 4/21 |
| | | | 701/408 |
| 2016/0131487 A1 | 5/2016 | Xu et al. | |
| 2016/0180602 A1* | 6/2016 | Fuchs | G06F 3/012 |
| | | | 463/31 |
| 2017/0026709 A1* | 1/2017 | Tilaye | H04N 21/4882 |
| 2018/0165882 A1 | 6/2018 | Choi et al. | |
| 2019/0069045 A1* | 2/2019 | Kahn | H04N 21/23418 |

OTHER PUBLICATIONS

US/RO: International Preliminary Report on Patentability dated May 14, 2021, for related International Application No. PCT/US2019/054854; 9 pgs.

* cited by examiner

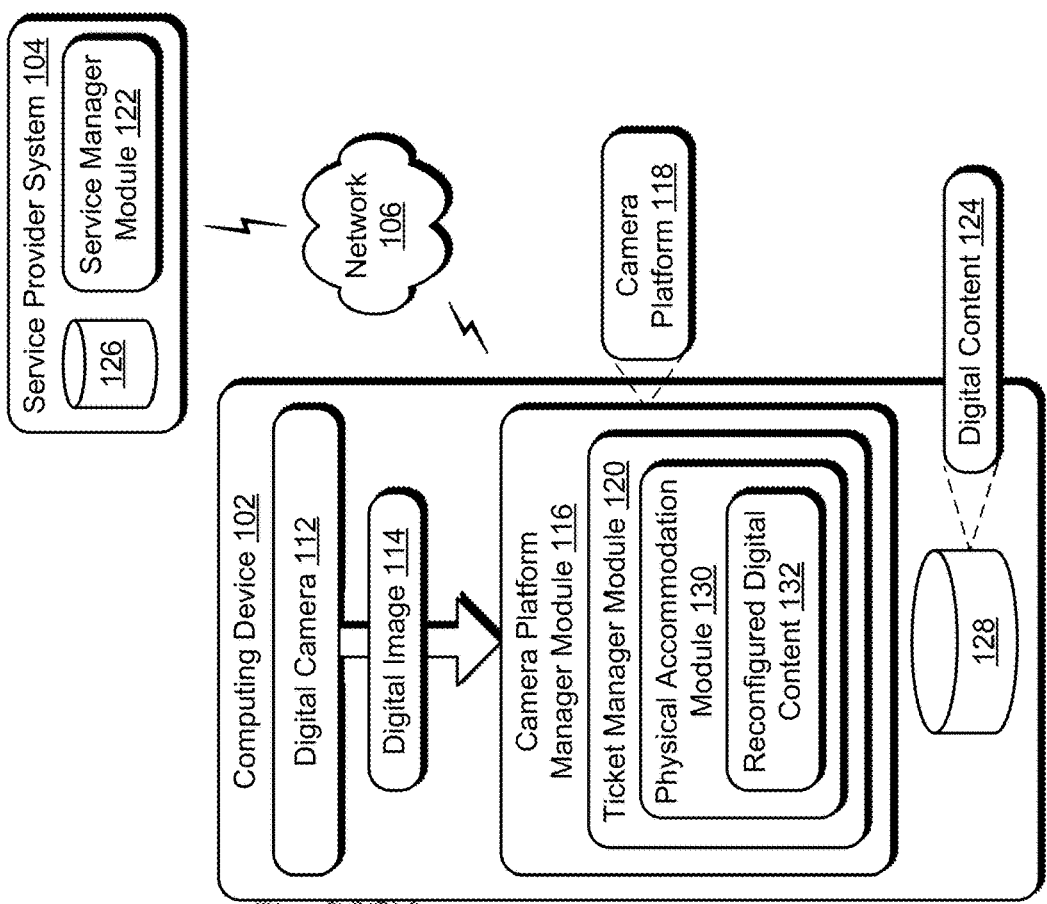
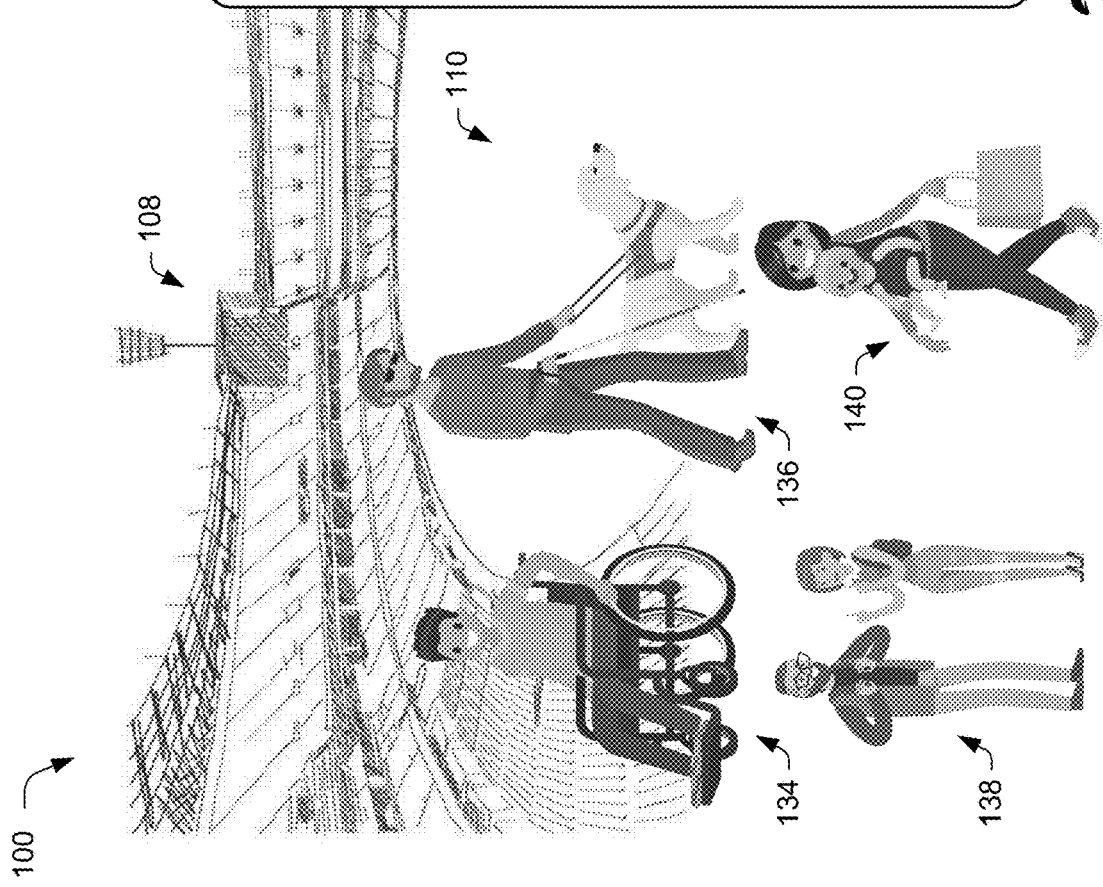
Fig. 1

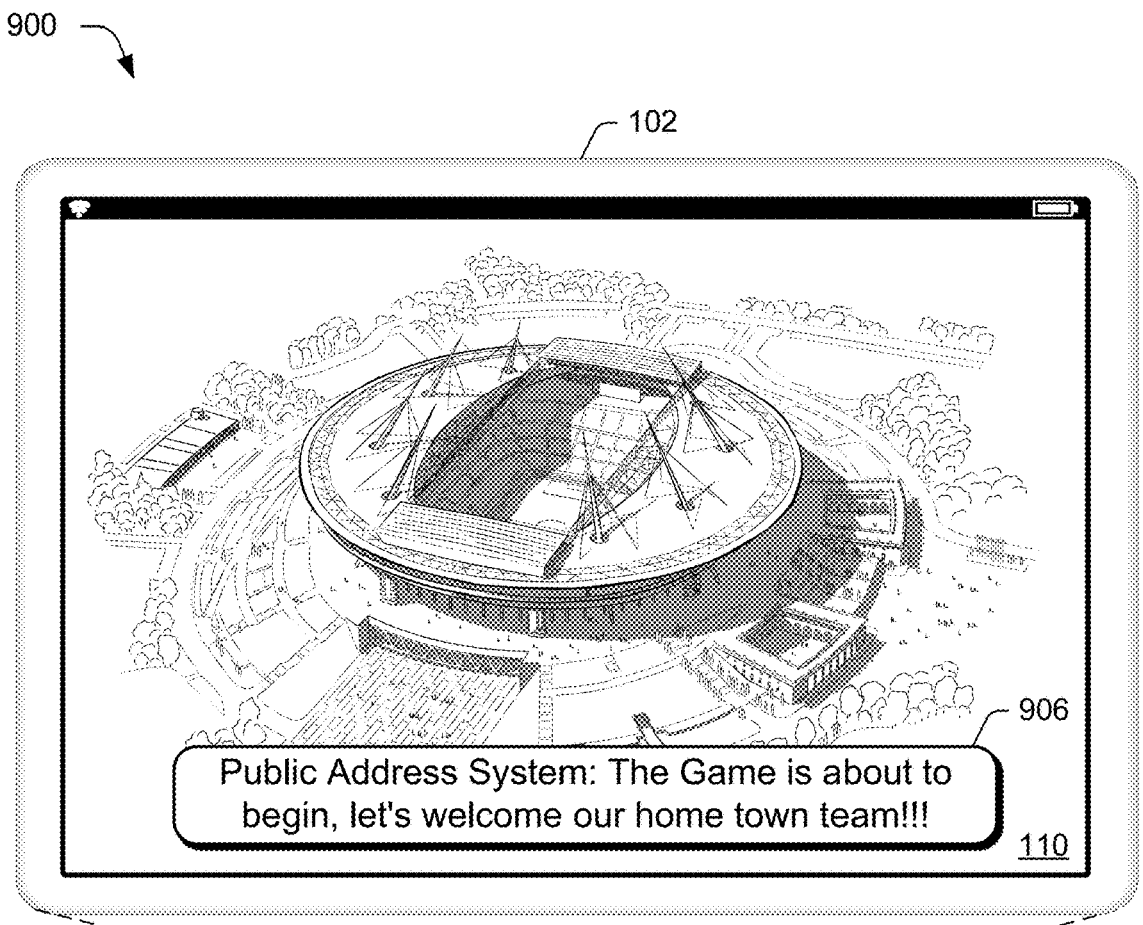
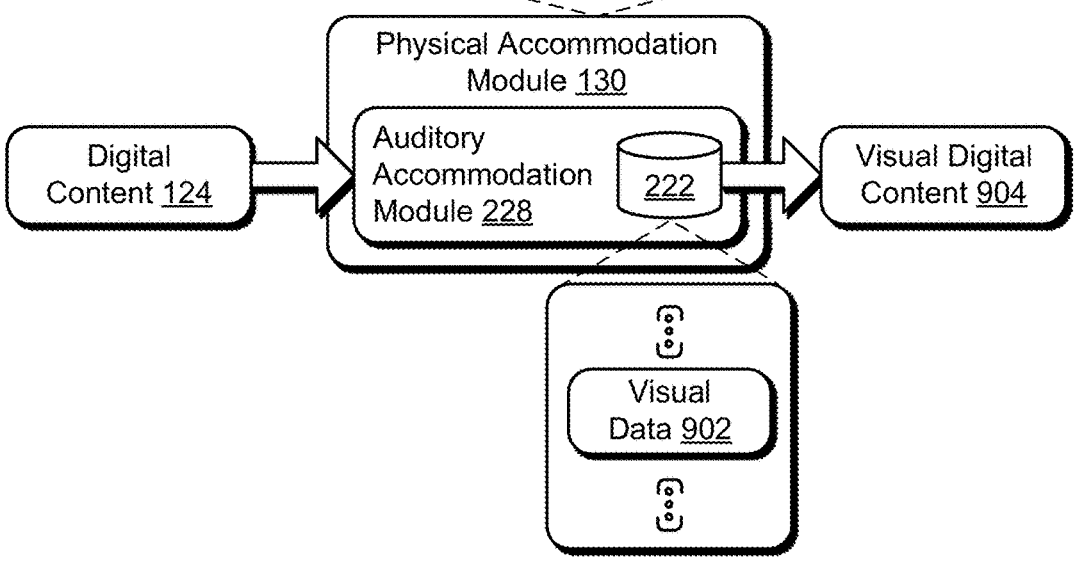
Fig. 9

DIGITAL CONTENT RECONFIGURATION BASED ON PHYSICAL ACCOMMODATIONS

BACKGROUND

Users may attend a wide range of events at a variety of physical venues. Users, for instance, may attend tech shows, concerts, sporting events, trade shows, and so on at physical venues that may support thousands, tens of thousands, and even over a hundred thousand participants at any one time. Further, physical venues may vary greatly, such that a layout may differ even for venues that are used for the same type of event, e.g., football games, baseball games, convention centers, and so forth.

Service provider systems that are tasked with supporting these different physical venues may provide digital content in an attempt to aide user interaction with events at the physical venues. For example, a service provider system may provide a map of the physical venue to enable the user to determine a location that corresponds to the ticket, i.e., an assigned "seat." However, conventional techniques to do so are static and are not able to address a wide range of physical accommodations of a multitude of users that may wish to attend a particular event. As such, this digital content may fail for its intended purpose and result in either these users forgoing the event altogether or require computational and user resource utilization to answer questions from these users that involve the physical accommodations. For example, this may involve calls to a customer service center which are resource intensive both to the service provider systems and users that interact with these systems.

SUMMARY

Digital content reconfiguration techniques and systems are described that address physical accommodations. In this way, the digital content is configured to adapt to physical accommodations and thus may improve user and computational efficiency of service provider systems that implement this digital content. In one example, a request is received from a user for digital content, e.g., a digital map (e.g., an augmented reality digital map), list of services (e.g., restaurants, bathrooms, menus), and so forth that is related to a physical venue.

In response, a physical accommodation module identifies a type of digital content being requested and obtains the digital content, e.g., from a service provider system via a network. The physical accommodation module also obtains ticket data associated with a user that made the request. The ticket data is then processed by the physical accommodation module to determine a physical accommodation. In one example, the ticket data identifies a physical accommodation based on a location of a "seat" of the ticket, e.g., associated with a mobility, visual, auditory, minor child, or other physical accommodation. In another example, the accommodations are based on user profile used to purchase the digital ticket, e.g., as part of a digital ticketing system.

The determined physical accommodation is then used by the physical accommodation module to reconfigure the digital content, and as such, may dynamically address the physical accommodation. The physical accommodation module, for instance, may dynamically reconfigure the digital content based on a mobility, visual, auditory accommodation and may also include accommodations for users that are attending the event with minor children. In this way, the physical accommodation module may dynamically reconfigure digital content that addresses physical accommodations and also improves user and computational efficiency, such as to decrease a number of calls made to a call center, use of messaging to an automated system, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of an environment in an example implementation that is operable to employ digital content configuration and reconfiguration techniques based on physical accommodations described herein.

FIG. 9 depicts an example implementation showing operation of an auditory accommodation module of FIG. 2 in greater detail as reconfiguring digital content for an auditory accommodation.

DETAILED DESCRIPTION

Figure 2:
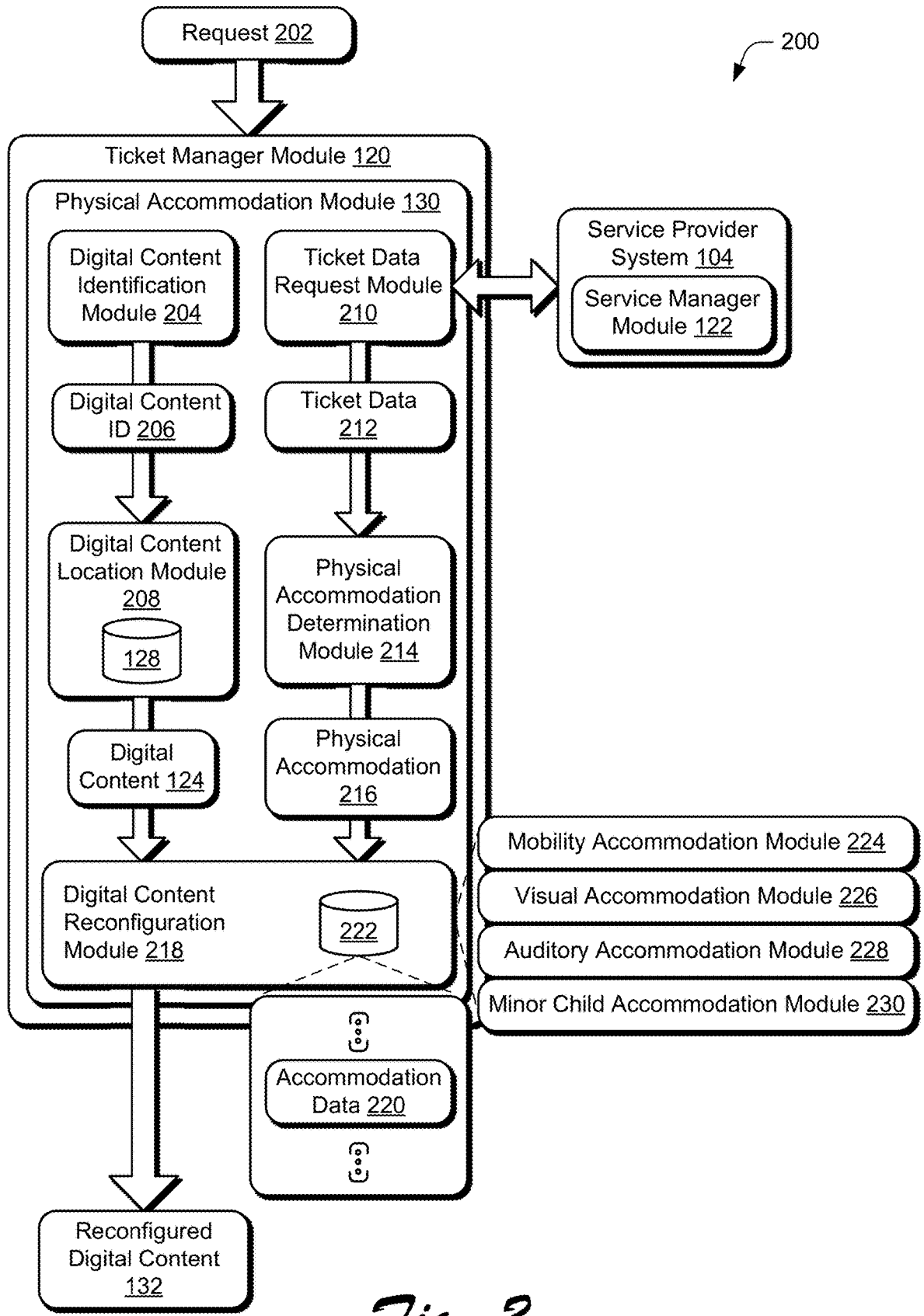
FIG. 2 depicts a system in an example implementation showing operation of a physical accommodation module of FIG. 1 in greater detail as generating reconfigured digital content based on a physical accommodation.

Physical venues may have a variety of configurations and architectures to support inclusion of thousands, tens of thousands, and even over a hundred thousand participants at any one time for an event. Accordingly, service provider systems that are provided to support user access to events that occur at these physical venues (e.g., digital ticketing systems, event coordinator systems, etc.) are faced with numerous challenges that are exacerbated by the multitude of users that may attend even a single event.

One such challenge of conventional service provider systems is that digital content that is generated to support user interaction at the physical venue, such as maps, lists of services, and so forth are typically static and do not address any physical accommodations of respective users. Such instances may cause this digital content to fail for its intended purpose and increase both user and computational resource consumption to address this failing, examples of which include increases in phone calls to customer service centers, messaging systems, and so forth.

Accordingly, digital content reconfiguration techniques and systems are described that address physical accommodations. In this way, the digital content is configured to adapt to physical accommodations and thus may improve user and computational efficiency of service provider systems that implement this digital content.

In one example, a request is received from a user for digital content, e.g., a digital map (e.g., an augmented reality digital map), list of services (e.g., restaurants, bathrooms, menus), and so forth that is related to a physical venue. In response, a physical accommodation module identifies a type of digital content being requested and obtains the digital content, e.g., from a service provider system via a network. The physical accommodation module, for instance, may map a user input (e.g., entered directly via text, indirectly using speech-to-text via a spoken utterance) to an identifier of the digital content, e.g., a map, augmented reality digital content, a list of services, and so forth. The identifier may then be used to obtain the digital content from a service provider system, e.g., a digital ticketing system.

The physical accommodation module also obtains ticket data associated with a user that made the request. The ticket data, for instance, may be obtained based on a seat number associated with a ticket of the user that is used to access the event at the physical venue. In another instance, the ticket data is associated with an account of a user that is used to purchase the ticket, e.g., as part of the digital ticketing system described above.

The ticket data is then processed by the physical accommodation module to determine a physical accommodation, if any. In one example, the ticket data identifies a physical accommodation based on a location of a "seat" of the ticket, e.g., associated with a mobility, visual, auditory, minor child, or other physical accommodation. The ticket data, for instance, may identify that the "seat" of the ticket is configured based on user accommodations based on mobility (e.g., for wheelchair access), hearing or visual (e.g., includes support functionality such as additional output devices), whether the user is accompanied by a minor child, and so forth. In another example, the accommodations are based on user profile used to purchase the digital ticket, e.g., as part of a digital ticketing system. A user, for instance, may identify one or more minor children that are also to attend the event at the physical venue as part of a user profile that is used to purchase tickets to the event.

The determined physical accommodation is then used by the physical accommodation module to reconfigure the digital content, and as such, may dynamically address the physical accommodation. The physical accommodation module, for instance, may dynamically reconfigure an augmented reality (AR) digital map based on a mobility physical accommodation to suggest navigation that is consistent with this accommodation, e.g., avoid stairs and escalators and instead use elevators, location of suitable restrooms, food services, and so forth. This may also be used to reconfigure the digital content for "how" the digital content is output, e.g., to emphasize auditory or visual output to address visual or auditory accommodations, respectively.

In an instance of a hearing physical accommodation, the digital content is configured to support increased visual content instead of auditory content, such as to list services, support captions of PA announcements, and so forth. The same is true of a visual physical accommodation, in which the digital content emphasizes auditory digital content over visual digital content. Similar reconfigurations may also be used for users attending the event with minor children, such as to suggest restrooms with changing tables, suitable concession and merchandising options, and so forth. In this way, the physical accommodation module may dynamically reconfigure digital content that addresses physical accommodations and thus improves user and computational efficiency, such as to decrease a number of calls made to a call center, use of messaging to an automated system, and so forth. Further discussion of these and other examples is included in the following sections and shown in corresponding figures.

In the following discussion, an example environment is first described that may employ the techniques described herein. Example procedures and systems are also described and shown as blocks which may be performed in the example environment as well as other environments. Consequently, performance of the example procedures is not limited to the example environment and systems and the example environment and systems are not limited to performance of the example procedures.

Example Environment

FIG. 1 is an illustration of a digital medium environment 100 in an example implementation that is operable to employ digital content generation and reconfiguration techniques described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles) and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" for the service provider system 104 as described in FIG. 11.

The computing device 102 is illustrated as being disposed with respect to a physical venue 108, e.g., a stadium or other venue as illustrated whether indoor and/or outdoor. The physical venue 108, for instance, may be configured as a stadium, conference center, event center, hotel, or any other public or private venue. Users 110 may thus attend events at the physical venue 108, which may include concerts, sporting events, talks, trade shows, conferences, benefits for charity, and so forth.

The computing device 102 in the illustrated example includes a digital camera 112 that is configured to capture digital images 114 of an outside physical environment, such as through use of a charge coupled device (CCD) sensor. The captured digital images 114 may then be stored as pixels in a computer-readable storage medium and/or rendered for display by a display device, e.g., LCD, OLED, LED, etc.

Figure 11:
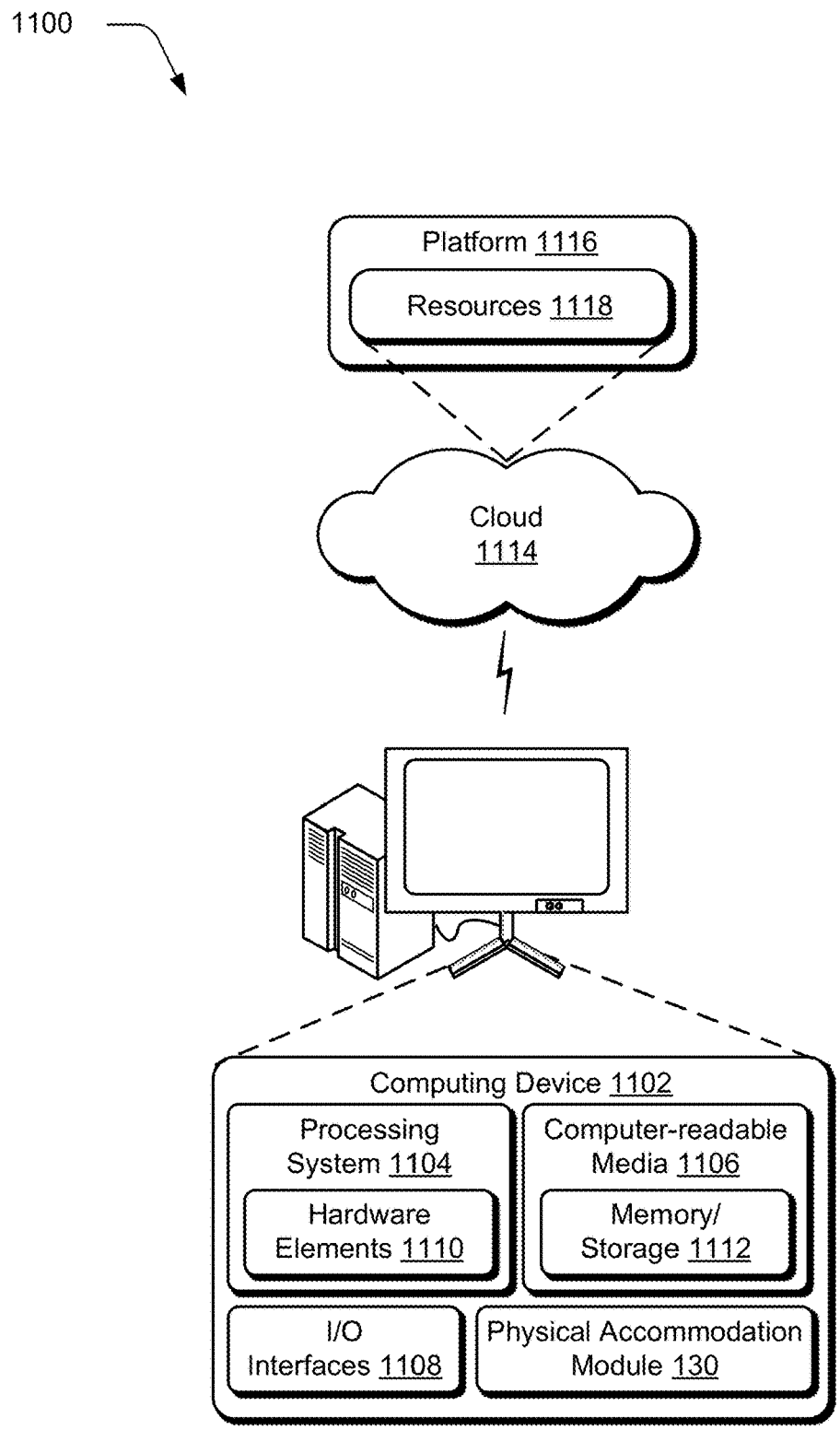
FIG. 11 illustrates an example system including various components of an example device that can be implemented as any type of computing device as described and/or utilize with reference to FIGS. 1-10 to implement embodiments of the techniques described herein.

The computing device 102 also includes a camera platform manager module 116 that is configured to implement and execute a camera platform 118 (e.g., through use of a processing system and computer-readable storage media of FIG. 11) that may serve as a basis for a variety of functionality. The camera platform 118, for instance, may implement a "live view" formed of digital images 114 taken of the physical environment of the computing device 102. These digital images 114 may then serve as a basis to support other functionality, such as to support output of augmented reality (AR) digital content as further described below.

An example of functionality of the camera platform manager module 116 is illustrated as a ticket manager module 120. The ticket manager module 120 is configured to aid user interaction with events at the physical venue 108. The ticket manager module 120, for instance, may be configured to interact with a service manager module 122 of the service provider system 104, via the network 106, to obtain digital content 124 from a storage device 126. The digital content 124, obtained from the service provider system 104 is then maintained locally in a storage device 128 of the computing device 102, e.g., in a computer-readable storage medium. The service provider system 104, for instance, may be configured as a ticketing system that provides tickets to attend events at a variety of physical venues. In another instance, the service provider system 104 is associated with the physical venue, itself, e.g., an owner/operator of the physical venue 108. Local examples are also contemplated in which the ticket manager module 120 interacts and maintains the digital content 124 without communication with the service provider system 104, e.g., the ticket itself.

The digital content 124 may be configured in a variety of ways to aid interaction of the users 110 with the physical venue 108 and events at the venue. The digital content 124, for instance, may be configured as augmented reality (AR) digital content that is output in conjunction with a live feed of the digital images 114 captured by the digital camera 112. AR digital content may describe a location of a seat, directions to the seat, a relation of that seat to other user's seats, and so forth. This AR digital content, for instance, may support a "fly over" view of the physical venue 108 and then automatically transition to output of indications to guide navigation of the users 110, e.g., arrows in a hallway to guide the users 110 to a ticketed "seat." This may also be used to guide users 110 to facilities such as restrooms, concessions, merchandise, and so forth. In this way, the camera platform 118 supports functionality for the users 110 to "look around" the physical environment and gain insight into events and the physical venue 108.

Other examples of digital content 124 are also contemplated. These examples include output of lists of services and facilities available at the physical venue 108, real time output of associated digital content 124 including public address (PA) announcements, play-by-play announcements, fantasy statistics, scores, lyrics, speech-to-text and text-to-speech data, and so forth. In this way, the digital content 124 may be used to expand interaction of the users 110 with the physical venue 108 and events that occur at the physical venue 108.

In some instance, however, attendance of users 110 at an event at the physical venue 108 may involve physical accommodations. Accordingly, the ticket manager module 120 includes a physical accommodation module 130 to generate reconfigured digital content 132 from the digital content 124 based on the physical accommodations. In this way, the digital content 124 may be adapted to address these accommodations to further aid user interaction with events and the physical venue 108, itself. Illustrated examples of physical accommodations include mobility 134, visual 136, auditory 138, and whether a user is attending the event with a minor child 140. Other examples of physical accommodations are also contemplated without departing from the spirit and scope thereof.

By reconfiguring the digital content 124 to address the physical accommodations, the physical accommodation module 130 may expand usefulness of this content to a wider range of users, which also increases user and computational efficiency as described above. Further discussion of these and other examples is included in the following section.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Configuration of Digital Content Based on Physical Accommodations

Figure 3:
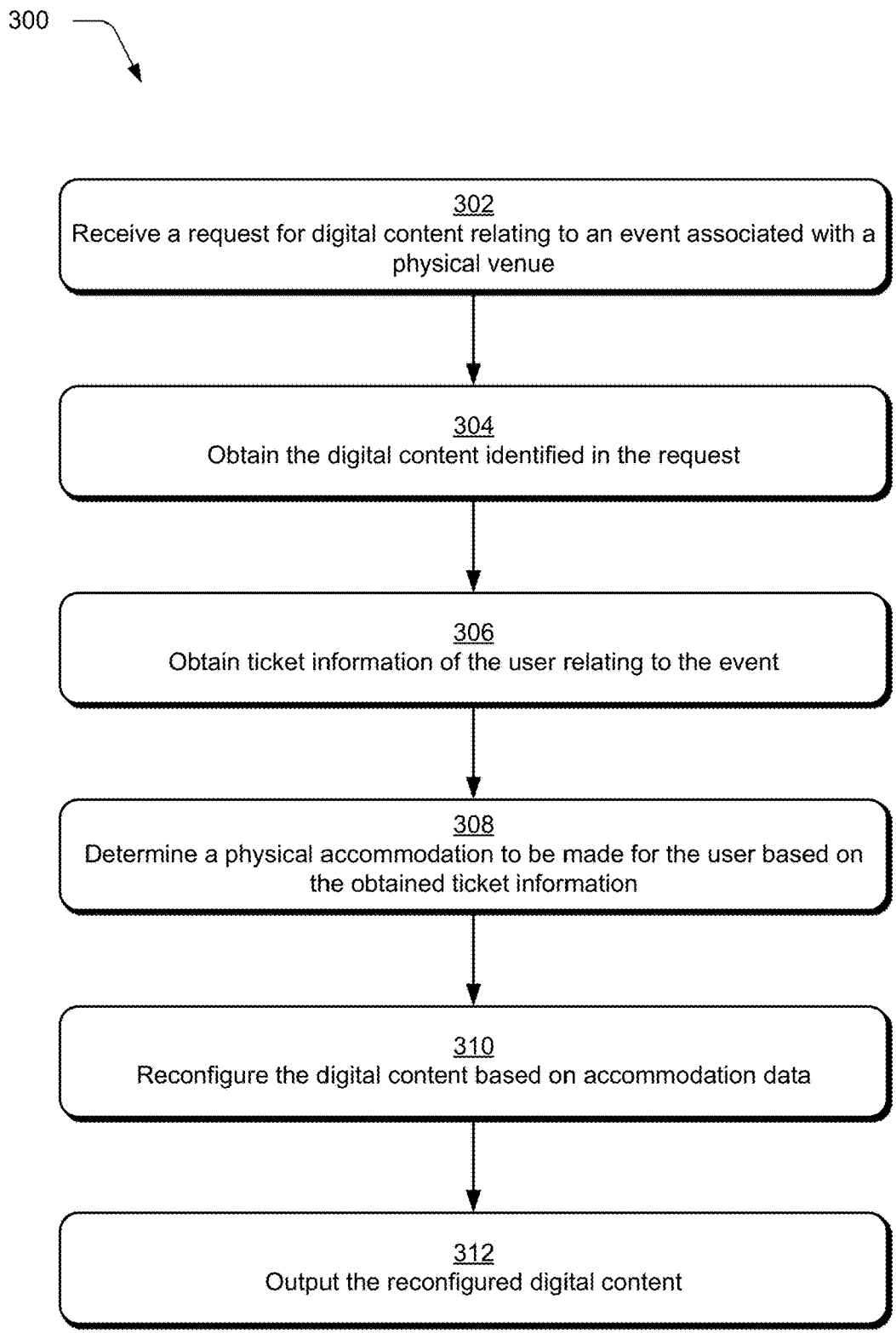
FIG. 3 is a flow diagram depicting a procedure in an example implementation in which a physical accommodation is determined from ticket data and used to reconfigure digital content associated with an event at a physical venue.

FIG. 2 depicts a system 200 in an example implementation showing operation of the physical accommodation module 130 of FIG. 1 in greater detail as generating reconfigured digital content 132 based on a physical accommodation. FIG. 3 depicts a procedure 300 in an example implementation in which a physical accommodation is determined from ticket data and used to reconfigure digital content 124 associated with an event at a physical venue 108.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

This example begins by receiving a request 202 for digital content relating to an event associated with a physical venue 108 (block 302). A user, for instance, may interact with an application executed on the computing device 102 that is associated the service provider system 104. The service provider system 104 may configured in a variety of ways, such as a ticketing system to provide tickets to the event at the physical venue 108, associated with the physical venue 108 itself, an entity that is associated with the event (e.g., teams, sports association, tech association, conference), and so forth.

The request 202 may be implemented in a variety of ways, such as through selection of an option in the user interface of the computing device 102, an utterance that is converted to text, a gesture, and so forth. A digital content identification module 204 is then employed by the physical accommodation module 130 to identify the digital content 124 included in the request 202, and based on this, generate a digital content ID 206. The digital content ID 206, for instance, may correspond to the selected option, may be determined from a list of options using natural language understanding of text input directly via user input (e.g., a keyboard displayed in the user interface) or indirectly, e.g., via speech-to-text functionality.

The digital content ID 206 is passed from the digital content identification module 204 in the illustrated example to a digital content location module 208. The digital content location module 208 is configured to obtain the digital content 124 identified in the request 202 (block 304). This may be performed in a variety of ways. In a first example, the digital content 124 is maintained locally in a storage device 128 as part of the application. In a second example, the digital content ID 206 is communicated to a service provider system 104 via the network 106. This causes the service manager module 122 to locate the digital content 124 using the ID. The located digital content 124 is then communicated back via the network 106 and maintained locally in the storage device 128 by the computing device 102. A variety of other examples are also contemplated.

Ticket data of the user which relates to the event is also obtained (block 306). Receipt of the request 202, for instance, may cause a ticket data request module 210 to obtain the ticket data 212 from a service provider system 104. As previously described, the service provider system 104 may be configured in a variety of ways, and thus obtaining the ticket data 212 may also be implemented in a variety of ways.

In one example, the service provider system 104 is a ticketing system (e.g., first or third party) and therefore the ticket data request module 210 may form a request that is communicated over the network 106 to the service provider system 104 to obtain the ticket data 212. The ticket data 212 may be based on a "seat" associated with the ticket, with a user account of the service provider system 104 used to obtain (e.g., purchase) the ticket, and so forth. Other examples are also contemplated that do not involve communication with the service provider system 104, such as to obtain the ticket data 212 directly from a ticket maintained locally by the ticket manager module 120 that is to be used to access the event at the physical venue 108.

The ticket data 212 is then passed from the ticket data request module 210 to a physical accommodation determination module 214 to determine a physical accommodation 216 to be made for the user based on the obtained ticket data 212 (block 308). The ticket data 212, for instance, may indicate physical accommodations associated with a seat location of the ticket, such as wheelchair access, assistive visual or auditory devices, seating for minor children, and so forth. Based on this, the physical accommodation determination module 214 determines the physical accommodation 216.

In another example, the ticket data 212 is associated with a user profile used by the service provider system 104 to purchase the ticket. The user, for instance, may specify physical accommodations to be considered when selecting tickets for seats, parking, and so forth at events through interaction with the service provider system 104. Accordingly, the user profile supplies ticket data 212 that may also be used as a basis to determine the physical accommodation 216 by the physical accommodation determination module 214.

Data describing the physical accommodation 216 is then communicated from the physical accommodation determination module 214 to a digital content reconfiguration module 218 along with the digital content 214 located by the digital content location module 208. The digital content 214 is reconfigured by the digital content reconfiguration module 218 to form the reconfigured digital content 132 based on accommodation data 220 (illustrated as stored in a storage device 222) corresponding to the determined physical accommodation (block 310) for output (block 312).

Reconfiguration of the digital content 124 (i.e., to generate the reconfigured digital content 132) may be performed using a variety of functionality. In a first example, a mobility accommodation module 224 is used to reconfigure the digital content 124 based on a mobility accommodation, further discussion of which is described in relation to FIGS. 4-7. In a second example, a visual accommodation module 226 is used to reconfigure the digital content 124 based on a visual accommodation, further discussion of which is described in relation to FIG. 8. In a third example, an auditory accommodation module 228 is used to reconfigure the digital content 124 based on an auditory accommodation, further discussion of which is described in relation to FIG. 9. In a fourth example, a minor child accommodation module 230 is used to reconfigure the digital content 124 based on inclusion of a minor child as part of attending the event at a physical venue 108, further discussion of which is described in relation to FIG. 10. Other physical accommodations are also contemplated.

Figure 4:
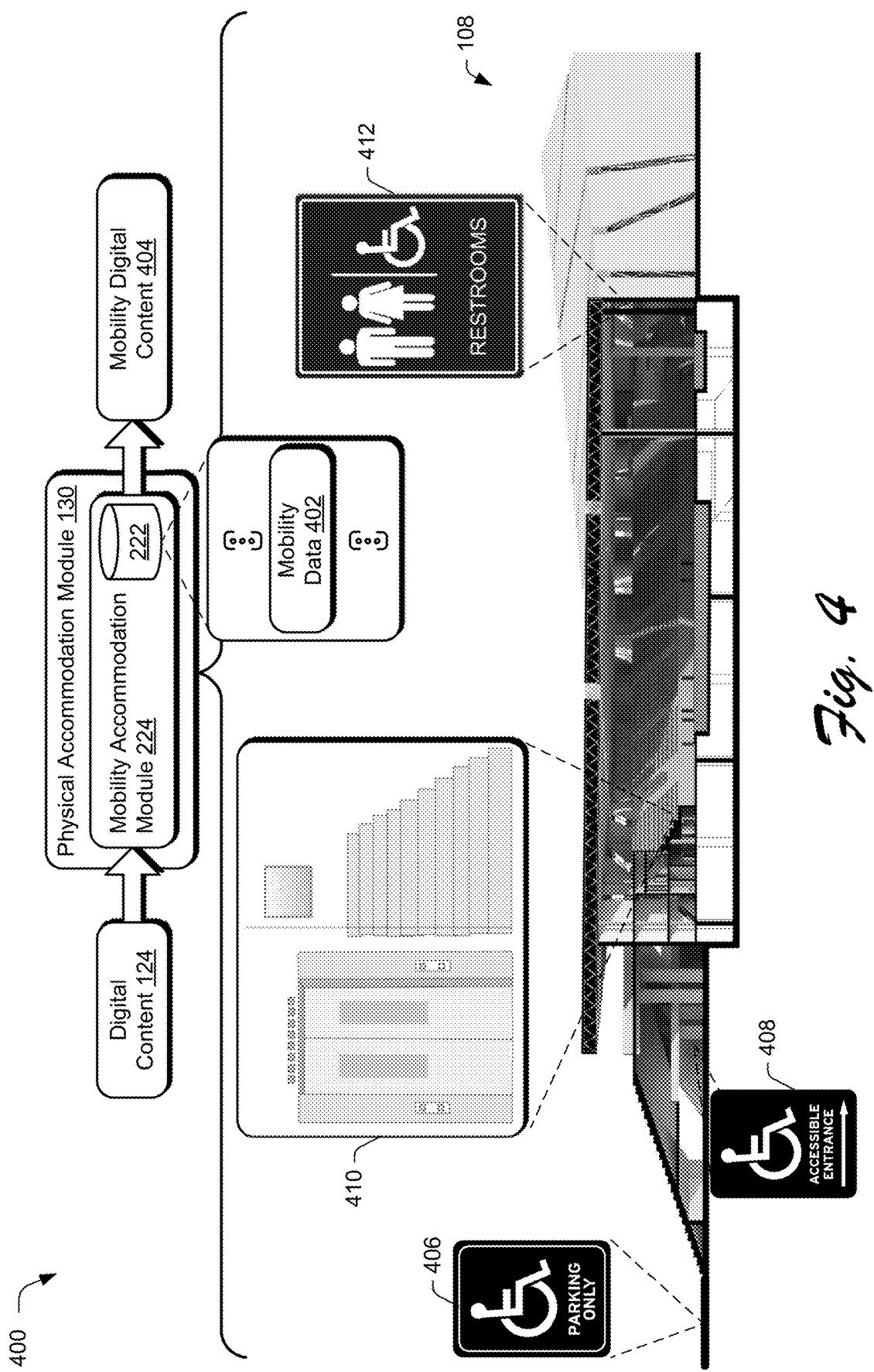
FIG. 4 depicts an example implementation showing operation of a mobility accommodation module of FIG. 2 in greater detail as reconfiguring digital content for a mobility accommodation.

FIG. 4 depicts an example implementation 400 showing operation of the mobility accommodation module 224 of FIG. 2 in greater detail as reconfiguring digital content 124 for a mobility accommodation. In this example, the mobility accommodation module 224 is employed to reconfigure the digital content 124 based on identification that the physical accommodation 216 involves mobility from the ticket data 212. The ticket data 212, for instance, may indicate that a location associated with the ticket is wheelchair accessible. From this, the mobility accommodation module 224 is employed to automatically configure digital content 124 that is a subject of the request 202 to address this physical accommodation.

The mobility accommodation module 224, for instance, may employ mobility data 402 to generate mobility digital content 404 that addresses considerations such as parking, accessible entrances 408, conveyances 410 (e.g., use of elevators instead of stairs or escalators), restrooms 412, and so forth at a physical venue 108. This may be used to configure maps, AR digital content for output as part of a live stream of digital images 114, listings of available services, facilities, and so forth.

Figure 5:
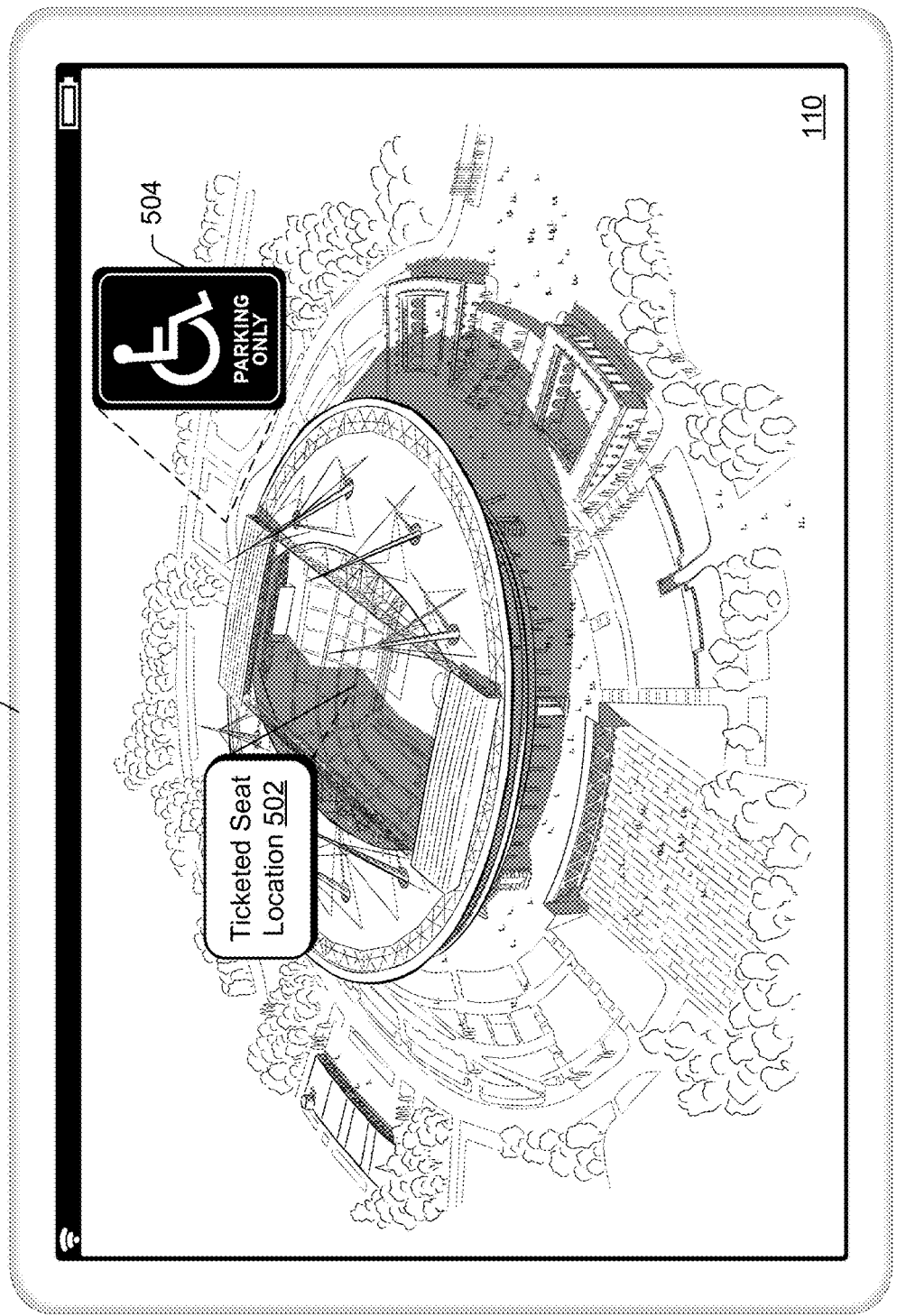
FIG. 5 depicts an example of the reconfigured mobility digital content of FIG. 4 as a map.

FIG. 5 depicts an example 500 of the reconfigured mobility digital content 404 of FIG. 4. In this example 500, the request 202 involves a map that is displayed in a user interface to indicate how to navigate to a ticked seat location 502 from a parking 504 lot. Based on the identification of the mobility physical accommodation, the map includes options and navigation based on this insight, including a location of mobility-based parking and how to navigate through the physical venue 108 using an appropriate route.

Figure 6:
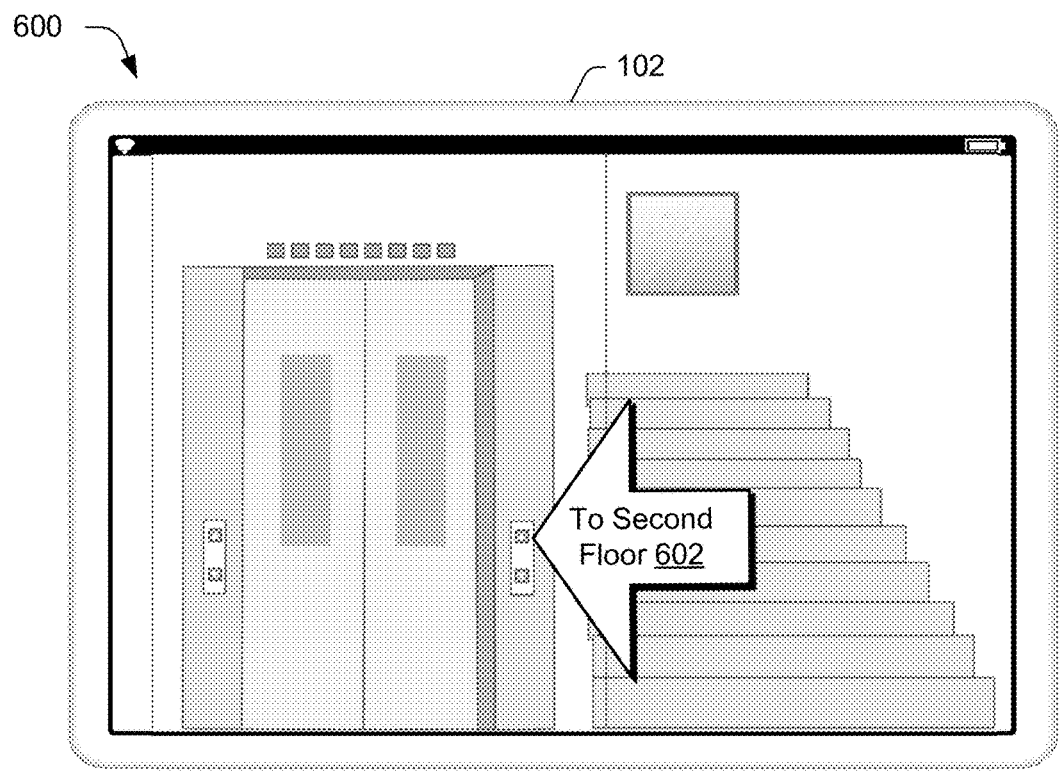
FIG. 6 depicts an example implementation in which AR digital content is used as part of a live feed of digital images that is reconfigured as mobility digital content of FIG. 4.
Figure 7:
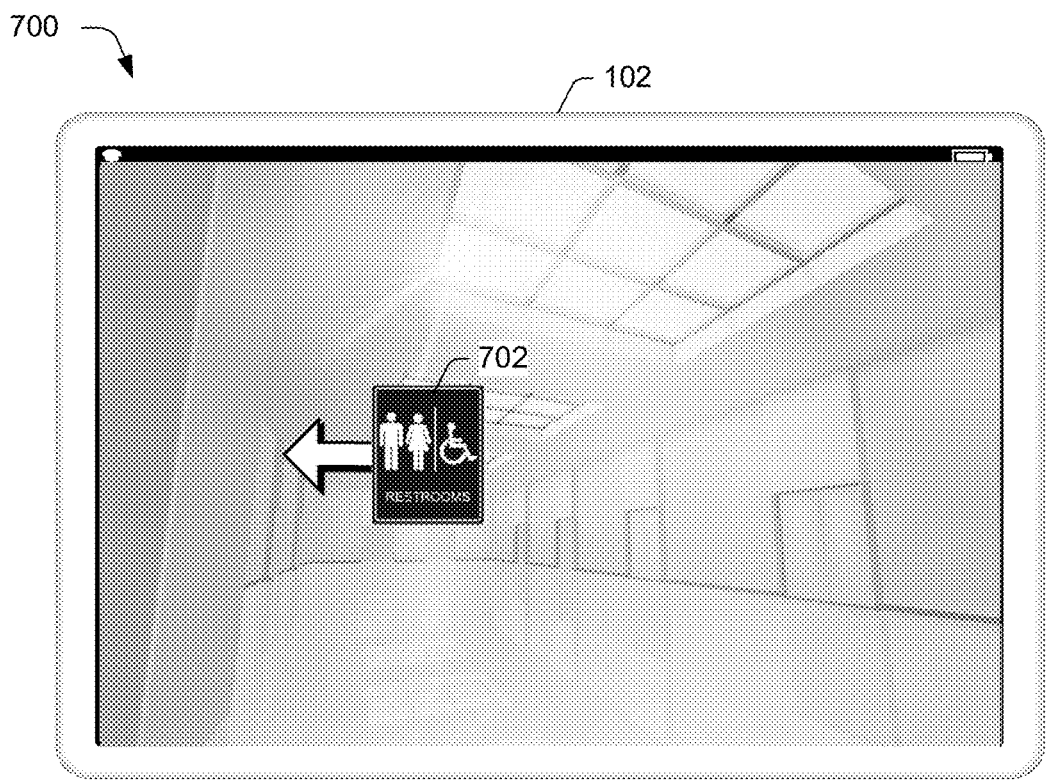
FIG. 7 depicts another example implementation in which AR digital content is used as part of a live feed of digital images that is reconfigured as mobility digital content of FIG. 4.

FIG. 6, for instance, depicts an example implementation 600 in which AR digital content 602 is used as part of a live feed of digital images 114 to indicate use of an elevator as well as a floor to travel using the elevator, e.g., the second floor. In the example implementation 700 of FIG. 7, AR digital content 702 is used to indicate a restroom that is wheelchair accessible. Other considerations may also be taken into effect, such as a knowledge of traffic flow of other users at the physical venue 108 and therefore to suggest a route that minimizes exposure to these other users.

Figure 8:
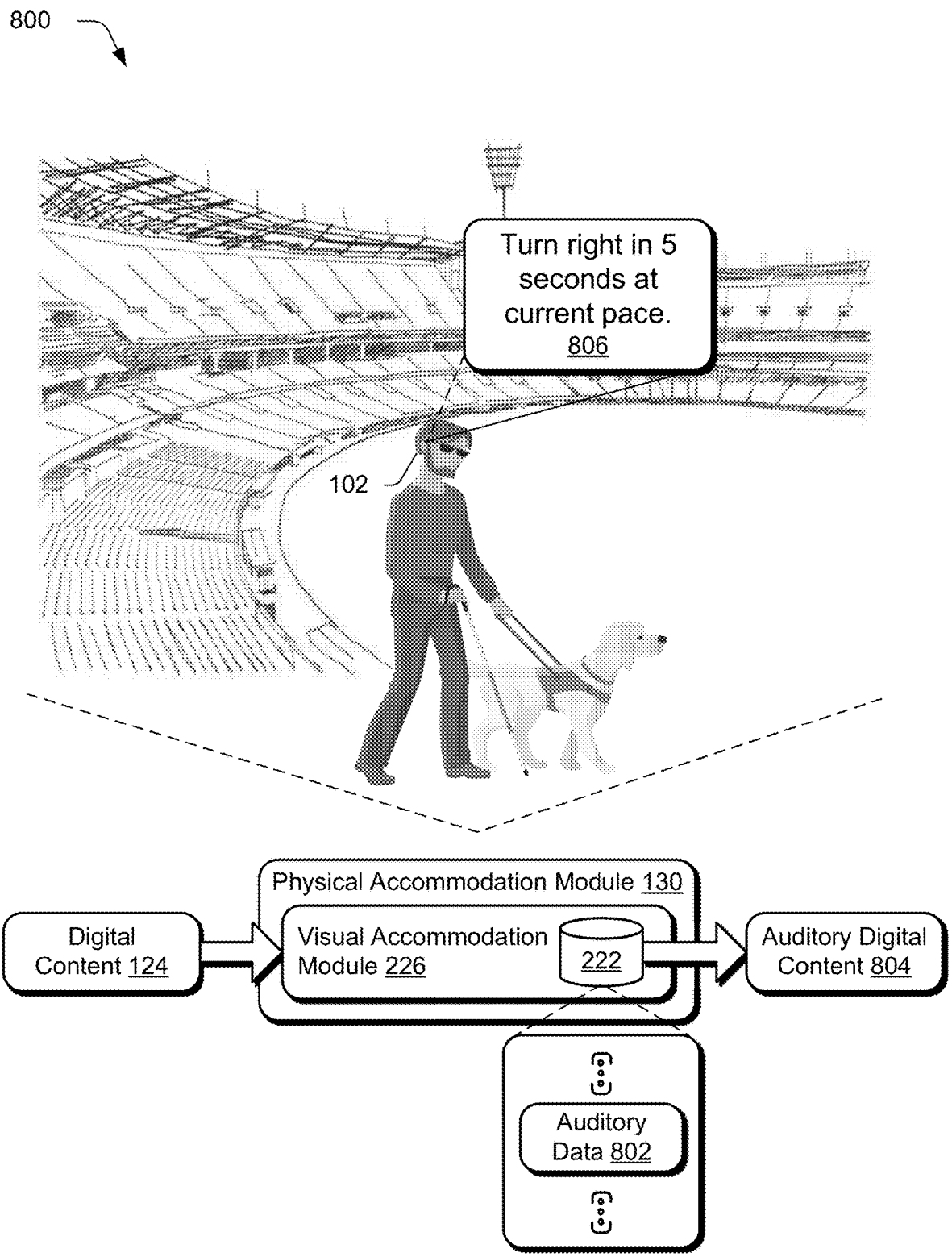
FIG. 8 depicts an example implementation showing operation of a visual accommodation module of FIG. 2 in greater detail as reconfiguring digital content for a visual accommodation.

FIG. 8 depicts an example implementation 800 showing operation of a visual accommodation module 226 of FIG. 2 in greater detail as reconfiguring digital content for a visual accommodation. In this example, the physical accommodation 216 is identified from the ticket data 212 that involves a visual accommodation, e.g., limited or loss of eyesight. Accordingly, the visual accommodation module 226 employs auditory data 802 to replace and/or supplement the digital content 124 to generate auditory digital content 804. In an example of directions, for instance, the computing device 102 may output these directions 806 using audio, with or without a visual indication. This may also be used to locate services, devices that may be available to promote interaction with the event, and so forth.

FIG. 9 depicts an example implementation 900 showing operation of an auditory accommodation module 228 of FIG. 2 in greater detail as reconfiguring digital content for an auditory accommodation. In this example, the physical accommodation 216 is identified from the ticket data 212 that involves an auditory accommodation, e.g., limited or loss of hearing. Accordingly, the auditory accommodation module 228 employs visual data 902 to replace and/or supplement the digital content 124 to generate visual digital content 904. In this illustrated example, this is used to provide a visual output of an announcement 906 of what otherwise would be output via a public address system. The announcement 906, for instance, may be configured by the auditory accommodation module 228 using speech-to-text. Other examples are also contemplated.

Figure 10:
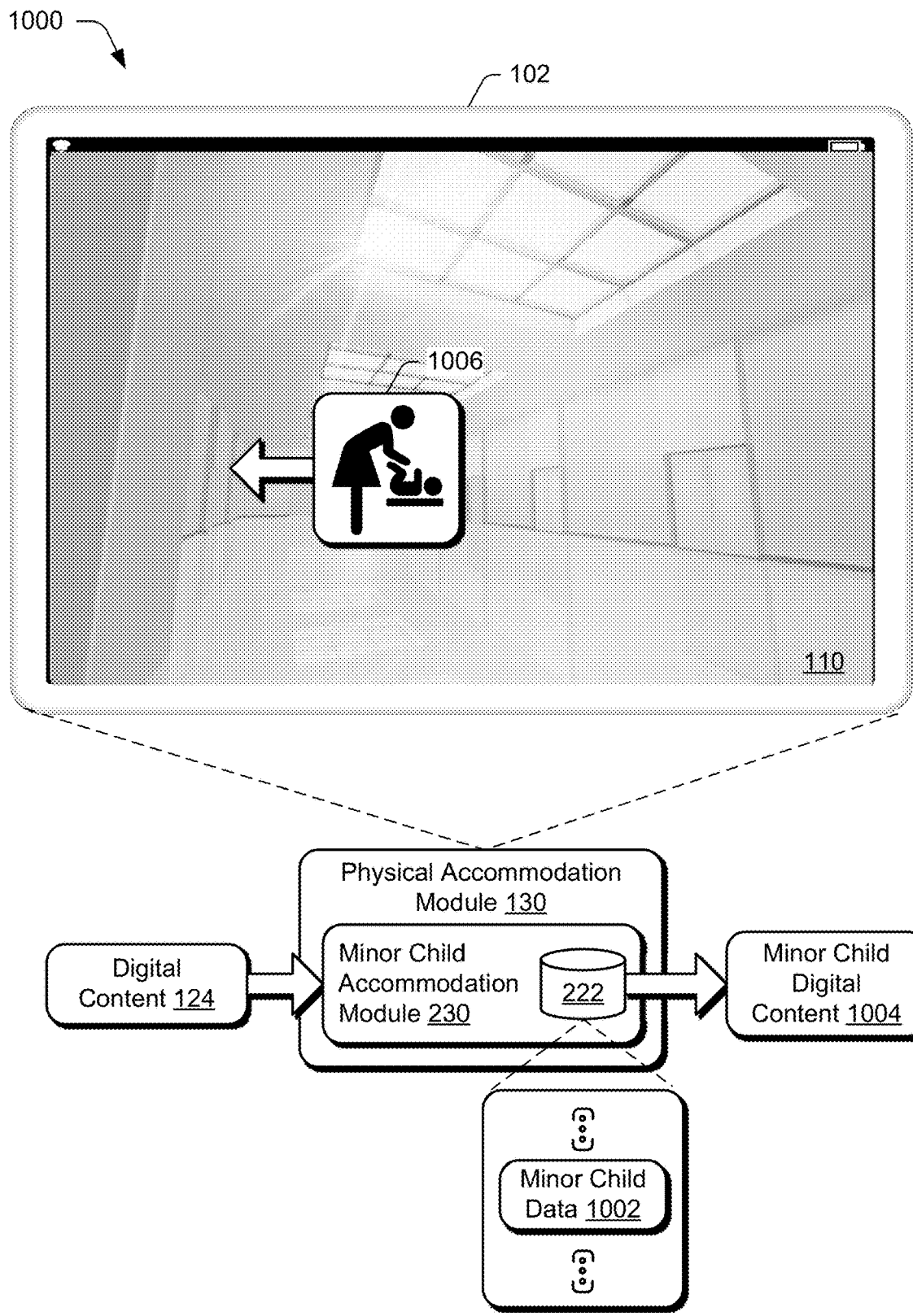
FIG. 10 depicts an example implementation showing operation of a minor child accommodation module of FIG. 2 in greater detail as reconfiguring digital content based on inclusion of a minor child as part of attending an event as a physical venue.

FIG. 10 depicts an example implementation 1000 showing operation of a minor child accommodation module 230 of FIG. 2 in greater detail as reconfiguring digital content based on inclusion of a minor child as part of attending an event as a physical venue. In some instances, a user attending an event at a physical venue 108 may do so with a minor child. This may be identified from the ticket data 212 that indicates inclusion of a minor child (e.g., a specially purchased ticket), seating of the minor child (e.g., a "lap" child that will share a seat), and so forth. The minor child accommodation module 230 may then leverage this information to generate minor child digital content 1004 using minor child data 1002 included as part of the accommodation data 220.

The request 202, for instance, may ask a location of a restroom. In response, the minor child digital content 1004 in the illustrated example is leveraged to output AR digital content 1006 that indicates a location of a restroom that is child friendly, e.g., includes a changing table, is a "family" restroom, and so forth. Other examples are also contemplated, such as to locate merchandise, concessions, and other services and items that are "kid friendly."

In this way, the physical accommodation module 130 may dynamically reconfigure digital content that addresses physical accommodations. This also acts to improve user and computational efficiency, such as to decrease a number of calls made to a call center of the service provider system 104, use of messaging to an automated system, and so forth.

Example System and Device

FIG. 11 illustrates an example system generally at 1100 that includes an example computing device 1102 that is representative of one or more computing systems and/or devices that may implement the various techniques described herein. This is illustrated through inclusion of the physical accommodation module 130. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method implemented by at least one computing device, the method comprising:

receiving, by the at least one computing device, a request for digital content from a user, the digital content relating to an event associated with a physical venue;
requesting, by the at least one computing device, the digital content from a service provider system;
receiving, at the at least one computing device, the digital content from the service provider system;
storing the digital content on a memory of the at least one computing device;
obtaining, by the at least one computing device, ticket data of the user relating to the event;
determining, by the at least one computing device, a physical accommodation involving a user's mobility based on at least one physical accommodation at a location of a seat of the ticket data;
obtaining, by the at least one computing device, accommodation data based on the physical accommodation;
reconfiguring, by the at least one computing device, the digital content stored on the memory of the at least one computing device, based on the accommodation data to address the user's mobility, wherein the reconfiguring is performed locally by a physical accommodation module within a ticket management module in the at least one computing device without communicating with an external service provider system; and
outputting, by the at least one computing device, the reconfigured digital content to the user.

2. The method as described in claim 1, wherein the determining is based on an indicated physical accommodation as indicated on a ticket of the user obtained to access the event at the physical venue.

3. The method as described in claim 1, wherein the determining is also based on an indicated physical accommodation of a user account of the user used to obtain a ticket, from a service provider system, to access the event at the physical venue.

4. The method as described in claim 1, wherein the obtaining of the ticket data includes forming a request for communication to the service provider system, from which, the user received a ticket to the event at the physical venue and receiving the ticket data from the service provider system via a network.

5. The method as described in claim 1, wherein the physical accommodation involves the user's mobility with respect to parking, accessible entrances, conveyances, or restrooms.

6. The method as described in claim 5, wherein the digital content is a map of the physical venue and the accommodation data includes mobility data that describes changes to directions indicated with respect to the map based on the user's mobility.

7. The method as described in claim 1, wherein the physical accommodation is also a visual accommodation for assistance when the user has limited or loss of eyesight.

8. The method as described in claim 7, wherein the accommodation data further includes auditory data that describes inclusion of at least a portion of the digital content for auditory output.

9. The method as described in claim 1, wherein the physical accommodation is also an auditory accommodation for assistance when the user has limited or loss of hearing.

10. The method as described in claim 9, wherein the accommodation data further includes visual data that describes inclusion of at least a portion of the digital content for visual output.

11. The method as described in claim 1, wherein the physical accommodation further involves inclusion of a minor child and the accommodation data further describes inclusion of at least a portion of the digital content specifying a minor child service available at the physical venue.

12. The method as described in claim 1, wherein the digital content is augmented reality (AR) digital content output as part of a live stream of digital images captures by a digital camera of the at least one computing device.

13. A system comprising:
a digital content identification module implemented by at least one computing device to identify digital content from a request received from a user, request the digital content from a service provider system, the digital content relating to an event associated with a physical venue;
a storage device of the at least one computing device configured to receive and store the digital content from the service provider system;
a ticket data request module implemented by at least one computing device to obtain ticket data of the user relating to the event;
a physical accommodation determination module implemented by at least one computing device to determine a visual or audio physical accommodation for assistance when the user has limited or loss of sight or hearing to be made for the user based on the ticket data; and
a digital content reconfiguration module implemented by at least one computing device to obtain accommodation data based on the visual or audio physical accommodation and reconfigure the digital content stored in the storage device based on the accommodation data within a ticket management module in the at least one computing device and without communicating with an external service provider system.

14. The system as described in claim 13, wherein the visual or audio physical accommodation also involves mobility, the digital content is a map of the physical venue, and the accommodation data also includes mobility data that describes changes to directions indicated with respect to the map.

15. The system as described in claim 13, wherein the visual or audio physical accommodation is visual and the accommodation data includes auditory data for inclusion with the digital content for output.

16. The system as described in claim 13, wherein the visual or audio physical accommodation is auditory and the accommodation data includes visual data for inclusion with the digital content for output.

17. A computing device comprising:
a processing system; and
at least one computer-readable storage media having instructions stored thereon that, responsive to execution by the processing system, causes the processing system to perform operations comprising:
receiving a request for digital content from a user, the digital content relating to an event associated with a physical venue;
requesting the digital content from a service provider system;
receiving the digital content from the service provider system;
storing the digital content on the computer-readable storage media;
obtaining ticket data relating to an event associated with a physical venue;
determining a physical accommodation based on the ticket data, wherein the physical accommodation includes an accommodation for a minor child as indicated on a ticket of a user;

obtaining accommodation data based on the physical accommodation;

reconfiguring, locally by a physical accommodation module within a ticket management module in the least one computing device, the digital content based on the accommodation data without communicating with an external service provider system; and outputting the reconfigured digital content.

18. The computing device as described in claim 17, wherein the digital content is a map of the physical venue and the physical accommodation further includes:

mobility and the accommodation data includes mobility data that describes changes to directions indicated with respect to the map;

visual and the accommodation data includes auditory data for inclusion with the digital content for output; or auditory and the accommodation data includes visual data for inclusion with the digital content for output.

19. The computing device as described in claim 17, wherein reconfiguring the digital content comprises modifying an output of at least a portion of the digital content configured as AR digital content using visual or auditory data.

* * * * *